United States Patent
Buhrke

(10) Patent No.: US 6,916,266 B2
(45) Date of Patent: Jul. 12, 2005

(54) TORQUE DIVISION ANGLE DRIVE GEARBOX

(75) Inventor: Frank Buhrke, Weinheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/651,509

(22) Filed: Aug. 29, 2003

(65) Prior Publication Data

US 2004/0132573 A1 Jul. 8, 2004

(30) Foreign Application Priority Data

Oct. 30, 2002 (DE) .......................................... 102 50 439

(51) Int. Cl.$^7$ .............................................. F16H 48/06
(52) U.S. Cl. ...................................... 475/225; 475/230
(58) Field of Search ................................ 475/204, 225, 475/230, 231

(56) References Cited

U.S. PATENT DOCUMENTS

| | | | | |
|---|---|---|---|---|
| 2,990,728 A | * | 7/1961 | Grenier ....................... | 475/131 |
| 3,482,471 A | * | 12/1969 | Crossman .................... | 475/94 |
| 5,391,124 A | | 2/1995 | Kasahara | |
| 6,350,165 B1 | * | 2/2002 | Neisen ......................... | 440/75 |
| 6,554,663 B2 | * | 4/2003 | Neisen ......................... | 440/75 |

FOREIGN PATENT DOCUMENTS

| | | |
|---|---|---|
| DE | 32 30 648 | 2/1984 |
| DE | 40 41 898 A 1 | 7/1991 |
| DE | 100 65 107 A 1 | 7/2002 |
| GB | 7 38 498 | 10/1955 |
| WO | WO 93/04 304 | 3/1993 |

* cited by examiner

*Primary Examiner*—Tisha Lewis

(57) ABSTRACT

A torque division angle drive gearbox is described that contains a torque division double bevel gear stage and a summing gearbox following downstream. In order to create a compact torque division angle drive gearbox it is proposed that an intermediate bevel gear be positioned between two ring gears arranged in mirror-image manner, where the intermediate bevel gear meshes simultaneously with both ring gears. The first ring gear is rigidly connected with a gear that is used as a sun gear of a single stage planetary gearbox. The second ring gear is rigidly connected with an internal gear. Planets circulate and mesh between the internal gear and sun gear and are connected with a planet carrier. A summing of the two torques occurs on the planet carrier through the relative movement of the planets between the internal gear and the sun gear with a total of a very high step-up speed ratio.

8 Claims, 1 Drawing Sheet

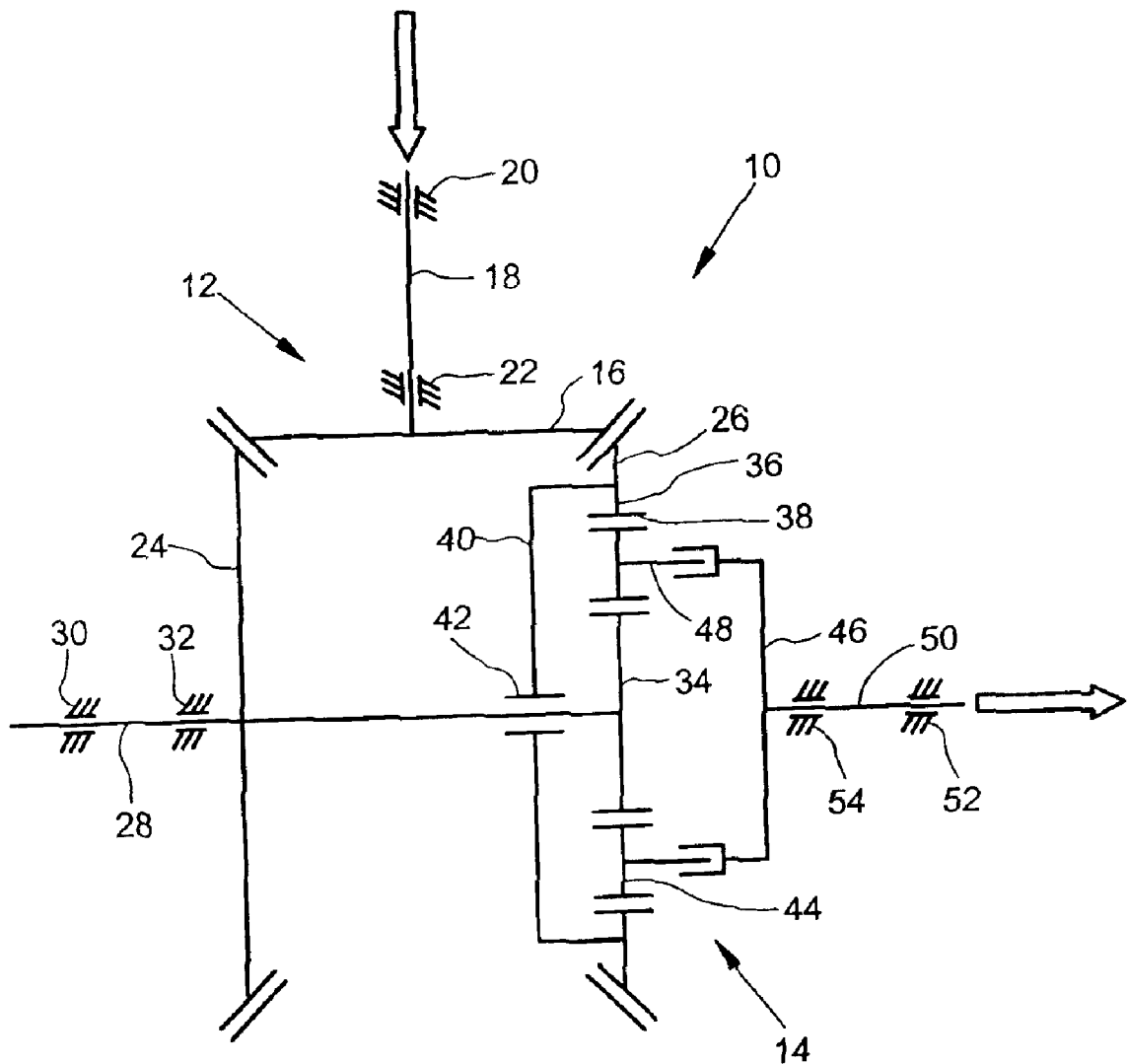

TORQUE DIVISION ANGLE DRIVE GEARBOX

FIELD OF THE INVENTION

The invention concerns a torque division angle drive gearbox with a double bevel gear stage and a summing gearbox following downstream of the bevel gear stage, where the bevel gear stage is driven by an intermediate bevel gear and contains a first and a second bevel gear and where the bevel gears are arranged in a mirror-image manner to each other and operate in rolling contact in opposite directions to each other.

BACKGROUND OF THE INVENTION

As a rule angle drive gearboxes consist of two bevel gears meshing with each other that are provided with differing diameters corresponding to the desired gear ratio. Frequently a relatively small pinion is used here as driving bevel gear which drives a relatively large ring gear in order to attain a large gear speed reduction ratio or a transmission of large torques. In special areas of application in which very compact configurations are demanded together with a guarantee of high gear reduction or step-up ratios, such as are required for motor vehicles or for agricultural or construction machines or utility vehicles as well as possibly for machine tools, angle gearboxes of the type applied in the past are at the limit of their capability. In particular in connection with drive components, such as differential gearboxes or differential, angle gearboxes in compact configuration with high step-up or reduction gear ratios and with high torque transmission capacities are demanded. The requirement for high torque transmission capacity leads, in particular with angle drive gearboxes, to problems that are difficult to overcome in the configurations of the bearing supports for the bevel gears, the input and output drive axles in regard to allowable deflections and in the selection of materials with respect to the required strengths for the transmission of the required forces. These problems can frequently be solved only at the cost of the size and the complexity of the configuration and the number of parts and the higher costs of the gearbox associated with it.

In order to increase the possible torque transmission capacity of angle drive gearboxes, angle gear drives have been developed upon the background of torque division that are provided with double bevel gear stages arranged in mirror image manner whose torque division branches are combined again over additional gearbox components or supplementary gearboxes or summing gearboxes. The result is that the input forces that can be transmitted are divided among two bevel gear stages. Thereby the required dimensions of the ring gears can be reduced and smaller configurations can be achieved.

For example DE 100 65 107 A1 discloses a torque division angle drive gearbox which is provided with a bevel gear that meshes with two ring gears arranged in mirror image manner. The torque is combined in additional intermediate gears arranged between the ring gears. As limited by this configuration this gearbox reduces or increases the rotational speed ratio of the main drive and the ring gear and therefore can deliver only limited reduction or speed increase ratios. Here the speed reductions or increases are directly connected with an increase in the volume of the configuration or the diameter of the ring gears. For an application as a compact component of a drive this angle drive gearbox is therefore very inappropriate.

Furthermore DE 40 41 898 A1 discloses an angle drive gearbox with torque division that is provided with bevel gears driving each other where a bevel gear configured as an intermediate bevel gear drives two bevel gears configured as ring gears or is driven by these. Here the torque is combined in a multiple gear ratio planetary gearbox connected to the ring gears. Here the disadvantage is that due to the high cost configuration of the multiple gear ratio planetary gearbox, with several planets located on a planet axis alongside each other, for one the volume of the configuration is very high and for another the number of component parts is very large. Here these characteristics also prove disadvantageous for an application in connection with differential gearboxes.

The task underlying the invention is seen in the need to define a torque division angle drive gearbox as defined initially through which the aforementioned problems are overcome. In particular an angle drive gearbox is to be created that makes possible a high torque transmission with low component volume and low numbers of component parts and that is provided with a low deflection of the input or the output shafts. Furthermore the configuration of the angle drive gearbox should be such that an integration of an axle-end drive can be used without any significant constructive limitations.

SUMMARY OF THE INVENTION

According to the invention a torque division angle drive gearbox of the type named initially is provided with a summing gearbox configured as a simple planetary gearbox, where the torques of the two branches distributed over the first and the second bevel gear are again combined on the planetary gearbox. Since the intermediate bevel gear meshes simultaneously on opposite sides with two bevel gears located opposite each other in mirror-image manner the forces to be transmitted are distributed over two torque branches. Thereby the loads on the materials are clearly reduced with constant torque transmission or the torque transmitted can clearly be increased with constant loads on the materials. Furthermore the mesh on both sides of the intermediate bevel gear results in bearing supports on both sides of the intermediate bevel gear. This leads to clearly reduced deflections of the bevel gear axis and thereby permits an optimized bearing support arrangement of the bevel gear shaft. The combination of the torque division is performed over the summing gearbox configured as a simple planetary gearbox. Here the simple or single stage planetary gearbox contains a sun gear, an internal gear, a set of planets, that mesh with and circulate about the sun gear, as well as a planet carrier, that carries the planets or on which the planets are supported in bearings. Thereby the planetary gearbox is configured in its simplest form. By the use of the simple or single stage planetary gearbox very high gear reduction ratios or gear step-up ratios can be attained with compact configurations. Particularly for applications in drive-lines, preferably in combination with differential gearboxes, these characteristics have a particular advantage. In a torque division angle drive gearbox according to the invention the divided branches of torque that are transmitted over the bevel gears can be combined in several combinations on the planetary gearbox. In this way the divided branches can be combined, for example, on the input side over the planet carriers and internal gear, so that the output drive can be performed over the sun gear. Furthermore on the input side the combination of planet carrier/sun gear is conceivable, so that the output drive is performed over the internal gear. For each of these possible combinations the result is that there are differing combinations of rotational speed and torque sequences.

In a particularly advantageous embodiment of the invention the combination is performed on the planet carrier of the planetary gearbox so that the output drive occurs over the planet carrier or the bridge. A torque division angle drive gearbox configured in this way is particularly advantageous for an application in the drive-line of a vehicle. Since one branch of the torque division is conducted over the internal gear and the other over the sun gear and both are combined over the planet carrier or the bridge, so that particularly advantageous torque and rotational speed sequences can occur particularly in connection with differential gearboxes within or outside of a drive-line with compact configuration.

In a particularly preferred embodiment of the invention the first and the second bevel gears are configured as ring gears. The ring gears may be provided with clearly larger diameters as compared to the intermediate bevel gear, that can lead to very high speed reductions or step-up ratios. Even with smaller ring gear diameters and the resulting advantageous smaller configuration volume, high reduction ratios or step-up ratios are attained by means of the single stage planetary gearbox arranged downstream, since the downstream planetary gearbox provides speed reduction or step-up ratios with clearly smaller configuration volumes.

In a further particularly preferred embodiment of the invention a first bevel gear is connected rigidly with a gear operating as sun gear of the planetary gearbox and a second bevel gear is connected rigidly with an internal gear of the planetary gearbox. Preferably a gear or a set of gear teeth is formed on or at the axis of rotation of the first bevel gear that operates as sun gear of the single stage planetary gearbox and meshes directly with the planets of the planetary gearbox. Here the sun gear can extend into the interior space of the internal gear formed by the second bevel gear. The set of gear teeth of the internal gear meshes with the radially outer side of the circulating planet gears. In this preferred embodiment of the invention the second bevel gear is configured as a combined ring gear and internal gear. Here the bevel gear is provided with an external set of gear teeth as a ring gear as well as a set of internal gear teeth as an internal gear. An angle gearbox is created by this configuration of the invention with which a very compact arrangement can be attained since the bevel gears are used as combined ring gear-sun gear and ring gear-internal gear combinations. Furthermore, this arrangement provides a high power density since the power is distributed over two gears or bevel gears operating in opposite rotational directions and is again combined over the planet carrier or the bridge of a single stage planetary gearbox. With such an arrangement of the invention of an angular gearbox in particular a very high speed reduction or step-up ratio can be attained with a very compact configuration. The speed reduction ratio or step up ratio attained by the bevel gear stage is supplemented by the following planetary gearbox stage. The speed reduction ratio or step-up ratio that can be attained by the planetary gearbox stage here is a function of the ratio of the diameter of the sun gear to the diameter of the internal gear. As a result the circulating rotational speeds of the planets and thereby the rotational speeds of the bridge of the planetary gearbox are a function of it.

Due to the combined configurations of the first bevel gear as ring gear and sun gear and the second bevel gear as ring gear and internal gear, as well as the single stage configuration of the planetary stage, a very compact angular gearbox with torque division is created with very few and compact components.

As a result of the large diameter of the ring gears in comparison to the intermediate bevel gear (drive gear) and of the following planetary gearbox, a high speed reduction can be attained at the output shaft of the planetary gearbox or at the bridge and thereby correspondingly low rotational speeds and high torques.

Analogously the bridge of the planetary gearbox could also be used as input drive shaft and thereby attain an opposite result, that is a high step-up ratio at the intermediate bevel gear (in this case used as output shaft).

Therefore a preferred embodiment of the invention provides that the drive of the angle gearbox with torque division can also be performed over the summing gearbox and that the torque branches are again combined in the double bevel stage on the intermediate bevel gear, where the intermediate bevel gear is connected with an output shaft.

Therefore a torque division angle drive gearbox equipped with the aforementioned characteristics according to the invention is appropriate particularly for an application in motor vehicles, agricultural and construction machines or utility vehicles as well as for an application to machine tools. Moreover the application of such an angle drive gearbox is particularly useful in cases where drive components are required that provide a compact configuration and high speed reduction ratios or step-up ratios and thereby a high torque transmission.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

FIG. 1 shows a schematic view of a torque division angle drive gearbox according to the invention.

DESCRIPTION OF THE PREFERRED EMBODIMENT

The FIGURE shows a torque division angle drive gearbox 10 that contains a bevel gear stage 12 and a planetary gearbox 14 arranged downstream thereof.

The bevel gear stage 12 is provided with an input drive bevel gear 16 that is rigidly connected with the drive axis 18. The drive axis 18 is supported in two shaft bearings 20, 22. The input drive bevel gear 16 represents an intermediate bevel gear, that is arranged between a first bevel gear 24 and a second bevel gear 26 and meshes simultaneously with both of these. The bevel gears 24 and 26 that are driven by the input drive bevel gear 16 are arranged in mirror-image manner to each other and accordingly operate in opposite rotational directions.

The first bevel gear 24 is configured as a ring gear and is provided with a clearly larger diameter than the input drive bevel gear 16. The first bevel gear 24 is connected rigidly with a bearing axis 28, supported on one side in two shaft bearings 30, 32, free to rotate, and fixed axially. On the other side of the bearing axis 28 there follows a gear 34 which is connected rigidly over the bearing axis 28 with the first bevel gear 24.

The second bevel gear 26 is provided with a combined configuration. For one it is configured on the outside in mirror-image manner to the first bevel gear 24 also as ring gear. For another it is configured in its radially interior area as an internal gear 36 with a set of internal gear teeth 38. The second bevel gear 26 is supported in bearings on the bearing axis 28, free to rotate, and fixed axially over a retaining bridge 40 and at least one shaft bearing 42.

Thereby the gear 34 that is rigidly connected to the first bevel gear 24 as well as the internal gear 36 at the second bevel gear 26 form parts of the single stage planetary gearbox 14, where the gear 34 is positioned in the interior of the internal gear 36 and represents the sun gear of the planetary gearbox 14.

Between the sun gear 34 and the internal gear 36 planets 44 are arranged that are distributed about the circumference and that circulate, that are supported in bearings, free to rotate, on the planet carrier 46 on planet journals 48 fastened to the planet carrier 46 supported in bearings, free to rotate. The planet carrier 46 is rigidly connected with an output shaft 50 that is supported in bearings on at least two shaft bearings 52, 54, free to rotate and fixed axially.

The configuration of the individual gears 16, 24, 26, 34, 36 and 44 that mesh with each other may be gears with teeth as well as friction wheels.

The power applied to the drive axis 18 (torque, rotational speed) is transmitted over the intermediate bevel gear 16 uniformly in two branches of torque on the first bevel gear 24 and the second bevel gear 26 rotating in the opposite direction. Since the bevel gears 24, 26 are clearly larger than the intermediate bevel gear 16 a first rotational speed reduction or rotational speed ratio is performed here. The one branch of the distributed torque is conducted to the planet 44 of the planetary gearbox 14 over the sun gear 34 of the planetary gearbox 14 connected directly with the first bevel gear 24. The second branch of the divided torque is also conducted to the planet over the internal gear 36 that is directly connected to the second bevel gear 26. Due to the opposite rotational direction of the sun gear 34 and the internal gear 36, the planets 44 circulate between the sun gear 34 and the internal gear 36 and sum or add the two torque branches on the planet carrier 46 of the planetary gearbox 14, where this rotates with clearly reduced rotational speed corresponding to the relative movement of the planets or corresponding to the diametral relationship of the sun gear 34 and the internal gear 36. Thereby a second rotational speed reduction or speed ratio is attained through the single stage planetary gearbox 14.

Although the invention has been described in terms of only one embodiment anyone skilled in the art will perceive many varied alternatives, modifications and variations in the light of the foregoing description as well as the drawing all of which fall under the present invention. In this way, for example, the flow of power may operate in the opposite direction so that the planet carrier 46 of the planetary gearbox 14 is driven and a step-up ratio in the direction of the bevel gear stage 12 occurs. In this case the previously described drive axis 18 would become the output axis and the previously described output axis 50 at the planet carrier 46 would become the drive axis of the torque division angle drive gearbox 10.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A torque division angle drive gearbox with a double bevel gear stage and a summing gearbox following downstream of the bevel gear stage where the bevel gear stage is driven by an intermediate bevel gear and contains a first and a second bevel gear, and where the bevel gears are arranged in mirror-image manner to each other and roll in mesh in opposite directions to each other, the first bevel gear being rigidly connected with a gear that is operating as a sun gear of a planetary gearbox and the second bevel gear being rigidly connected with an internal gear of the planetary gearbox, wherein the summing gearbox is configured as a simple or a single-stage planetary gearbox and the torque branches distributed over the first and the second bevel gears are combined on a planet carrier of the planetary gearbox.

2. A torque division angle drive gearbox according to claim 1, wherein the first and the second bevel gear are configured as ring gears.

3. A torque division angle drive gearbox according to claim 1, wherein one of the bevel gears is configured as a combined ring gear/internal gear and is provided with a set of external gear teeth forming the ring gear as well as a set of internal gear teeth forming the internal gear.

4. A torque division angle drive gearbox according to claim 1, wherein the drive is performed over the summing gearbox and the branches of the divided torque are again combined in the double bevel gear stage on the intermediate bevel gear.

5. A torque division angle drive gearbox according to claim 2, wherein one of the bevel gears is configured as a combined ring gear/internal gear and is provided with a set of external gear teeth forming the ring gear as well as a set of internal gear teeth forming the internal gear.

6. A torque division angle drive gearbox according to claim 2, wherein the drive is performed over the summing gearbox and the branches of the divided torque are again combined in the double bevel gear stage on the intermediate bevel gear.

7. A torque division angle drive gearbox according to claim 3, wherein the drive is performed over the summing gearbox and the branches of the divided torque are again combined in the double bevel gear stage on the intermediate bevel gear.

8. A torque division angle drive gearbox according to claim 5, wherein the drive is performed over the summing gearbox and the branches of the divided torque are again combined in the double bevel gear stage on the intermediate bevel gear.

* * * * *